United States Patent
Karlsson

(10) Patent No.: US 8,065,077 B2
(45) Date of Patent: Nov. 22, 2011

(54) ORGANIZING MEDIA DATA USING A PORTABLE ELECTRONIC DEVICE

(75) Inventor: Thomas Karlsson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1031 days.

(21) Appl. No.: 10/595,687

(22) PCT Filed: Nov. 3, 2004

(86) PCT No.: PCT/EP2004/012392
§ 371 (c)(1),
(2), (4) Date: May 4, 2006

(87) PCT Pub. No.: WO2005/045697
PCT Pub. Date: May 19, 2005

(65) Prior Publication Data
US 2008/0294650 A1    Nov. 27, 2008

(30) Foreign Application Priority Data
Nov. 4, 2003 (EP) ..................................... 03025176

(51) Int. Cl.
*G01C 21/00* (2006.01)
*G08G 1/123* (2006.01)
(52) U.S. Cl. ................... 701/201; 340/995.24

(58) Field of Classification Search .................. 701/200, 701/201, 202, 207, 208, 213, 10, 102; 340/988, 340/989, 990, 995.1, 995.14, 995.18, 995.24, 340/996
See application file for complete search history.

(56) References Cited

U.S. PATENT DOCUMENTS

| | | | | |
|---|---|---|---|---|
| 6,381,603 B1* | 4/2002 | Chan et al. | ...... | 707/10 |
| 6,553,310 B1* | 4/2003 | Lopke | ...... | 701/213 |
| 2002/0004701 A1* | 1/2002 | Nakano | ...... | 701/200 |
| 2003/0140056 A1* | 7/2003 | Wall et al. | ...... | 707/102 |
| 2003/0164822 A1* | 9/2003 | Okada | ...... | 345/204 |
| 2004/0008225 A1* | 1/2004 | Campbell | ...... | 345/764 |

OTHER PUBLICATIONS

International Search Report mailed on Apr. 25, 2005.
International Preliminary Examination Report mailed on Dec. 13, 2005.

* cited by examiner

*Primary Examiner* — James Trammell
*Assistant Examiner* — Muhammad Shafi
(74) *Attorney, Agent, or Firm* — Harrity & Harrity, LLP

(57) ABSTRACT

The present invention relates to an electronic communication device, a portable electronic device, a method, a computer program product, a computer program element, and a system for organizing electronic media data in relation to fix points of geographic locations. The method for organizing electronic media data in relation to fix points of geographic locations, according to the present invention, comprises: obtaining at least one said fix point related to a scheme (step 804), obtaining at least a link to electronic media data under the control of a user (step 808), determining position of said user (step 810), and associating said obtained data with said at least one fix point (step 816), so that a link from said at least one fix point to the associated data can be provided to the user.

11 Claims, 4 Drawing Sheets

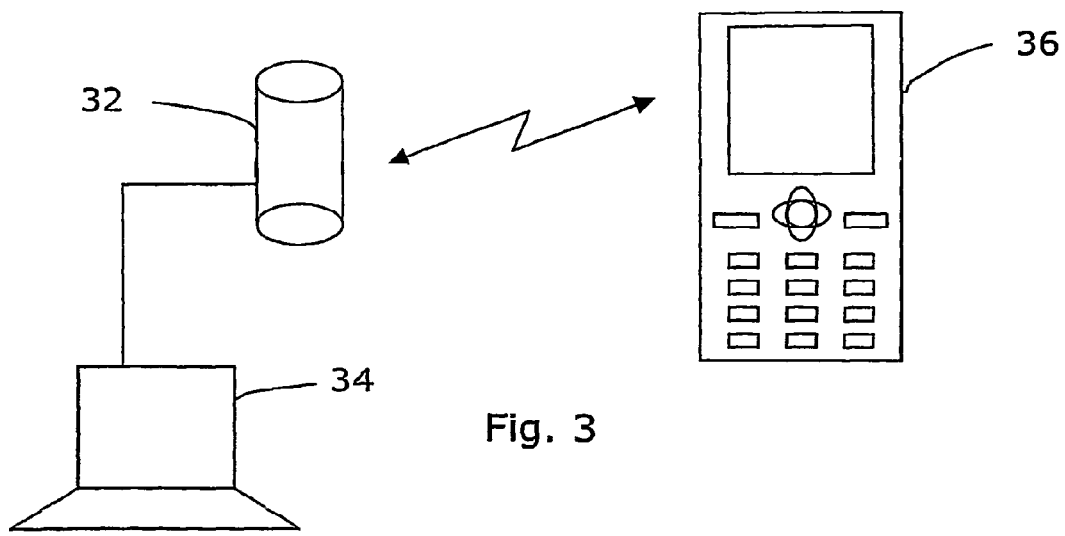
Fig. 3
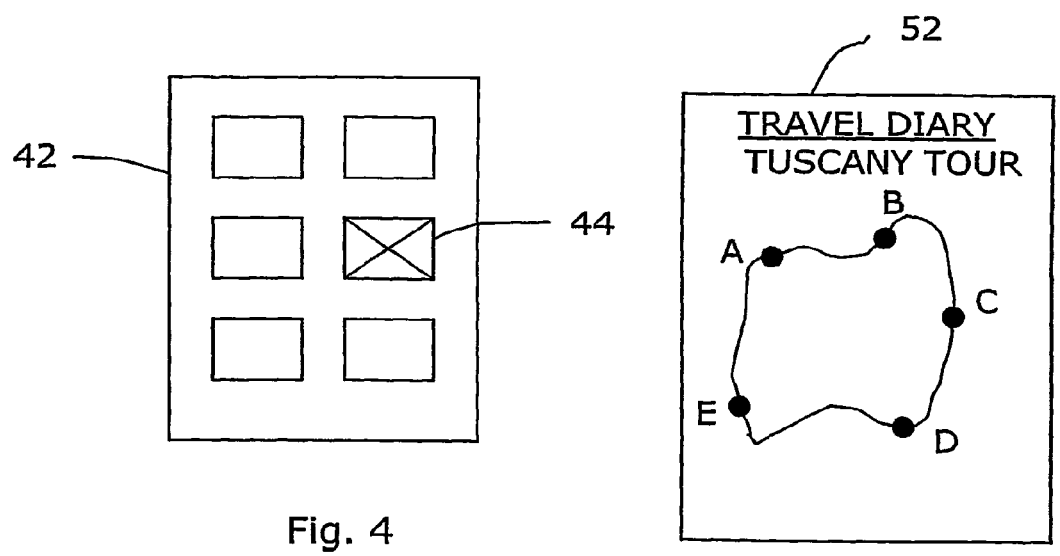
Fig. 4
Fig. 5
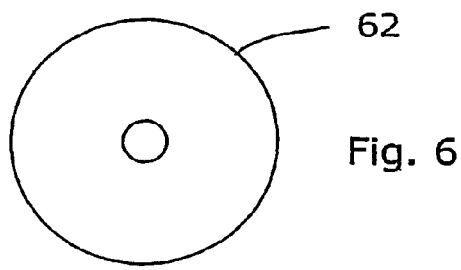
Fig. 6

ORGANIZING MEDIA DATA USING A PORTABLE ELECTRONIC DEVICE

TECHNICAL FIELD OF THE INVENTION

The present invention relates to electronic organizing of data in relation to fix points. More particularly it relates to a portable electronic device, an electronic communication device, a method for organizing electronic media data in relation to fix points of geographic locations, and a system for organizing electronic media data in relation to fix points of geographic locations.

DESCRIPTION OF RELATED ART

People tend to spend more and more time and money on traveling. As the importance increases, planning of trips have become popular, as a trial to increase the outcome of a trip and to avoid tourist traps.

Some degree of planning is performed already around the kitchen table, for example a map is collected and a few potentially interesting sightseeing spots are identified.

Using electronic equipment, storing parts of this data electronically is made possible.

While on vacation visiting the desired sightseeing spot, a number of still pictures, video-clips, films, sound recordings or the like can be recorded.

Returning home after the journey while looking at pictures, video-clips, etc., it is soon realized that remembering where data was collected can be a problem. Also, as the number of trips and travels tend to increase year by year, a huge collection of electronic media data is resulted and sorting out what is where, can become a tedious and boring exercise.

It would be advantageous to easily obtain information about where accessed data was collected, and to receive help in sorting out what is where in the ever increasing electronic media data collection.

There is thus a need for providing a way to organize data so that it is clear where data was collected and so that it is being sorted out what obtained data is where, within the data collection.

SUMMARY OF INVENTION

Implementations consistent with the principles of the invention associate obtained data with the location where data was obtained, in a scheme related to said location.

This is achieved by associating obtained data with at least one fix point associated with the position of the user when the data was obtained, so that a link from said at least one fix point to the associated data can be provided to a user.

According to one aspect of the invention, a method for includes obtaining at least one fix point related to a travel scheme, obtaining electronic media data under a control of a user, determining a position of said user, and associating said obtained electronic media data with said fix point.

A third aspect of the invention is directed towards a method including the features of the first aspect and further comprising providing the travel scheme, and connecting said at least one fix point to said travel scheme.

A fourth aspect of the invention is directed towards a method including the features of the first aspect and further comprising storing the associated electronic media data.

A fifth aspect of the invention is directed towards a method including the features of the first aspect and further comprising providing a link from the fix point to the associated electronic media data.

According to a sixth aspect of the invention, a method for organizing data in relation to fix points of geographic locations, includes obtaining a fix point, providing a travel scheme for fix points, placing said fix point in the travel scheme, obtaining electronic media data under a control of a user, determining a position of said user, and associating said electronic media data with said fix point based on the position, so that a link from said fix point to the associated electronic media data can be provided to the user, in relation to said travel scheme.

A seventh aspect of the invention is directed to a method including the features of the sixth aspect and further comprising providing access to data obtained by an electronic device by providing a link from the fix point to the associated electronic media data, in relation to said travel scheme.

According to an eighth aspect of the invention, a portable electronic device is arranged to at least partly organize data in relation to fix points of geographic locations. The portable electronic device comprises a user input unit, arranged to receive user input data, a positioning unit, arranged to determine a position of a user, at least one data receiving unit, arranged to obtain at least a link to electronic media data in dependence of user control via the user input unit, and a control unit arranged to obtain a fix point of a geographic location, to receive the position of the user from the positioning unit, and to associate the electronic media data with said fix point, so that a link from the fix point to the associated electronic media data can be provided to the user.

A ninth aspect of the invention is directed to a portable electronic device including the features of the eighth aspect, in which the control unit further is arranged to associate data obtained at the position of the user with the fix point associated with the position of the user.

A tenth aspect of the invention is directed to a portable electronic device including the features of the eighth aspect and further comprising an information presentation unit, arranged to present information by the control unit, under the control of the user.

An eleventh aspect of the invention is directed to a portable electronic device including the features of the eighth aspect and further comprising a memory unit, arranged to store data received from the at least one data receiving unit under the control of the control unit.

A twelfth aspect of the invention is directed to a portable electronic device including the features of the eighth aspect, in which the portable electronic device is a mobile phone.

According to a thirteenth aspect of the invention, a system includes an electronic communication device. The electronic communication device is arranged to obtain at least one fix point, obtain a travel scheme for fix points, and position said at least one fix point on said travel scheme. The system further includes a portable electronic device arranged to: obtain electronic media data under control of a user, determine position of said user, and associate said obtained electronic media data with a fixed point of said at least one fix point, so that a link from said fix point to the associated electronic media data can be provided to the user, in relation to said travel scheme.

A fourteenth aspect of the invention is directed to a system including the features of the thirteenth aspect and wherein the electronic communication device is further arranged to provide access to data obtained by the portable electronic device, by providing a link from the fix point to the associated electronic media data.

According to a fifteenth aspect of the invention, a computer program product comprising a computer readable medium, having thereon computer program code, to make a computer or an electronic device perform, when said program code is loaded in the computer or the electronic device, a method including obtaining at least one fix point related to a travel scheme, obtaining at least a link to electronic media under control of a user, receiving a position of said user, and associating of said electronic media with said at least one fix point based on the position, so that a link from said at least one fix point to the associated electronic media can be provided to the user.

According to a sixteenth aspect of the invention, a computer program element comprising computer program code to make a computer or an electronic device perform a method including obtaining of a fix point related to a travel scheme, obtaining electronic media under a control of a user, receiving a position of said user, and associating said obtained electronic media with said fix point based on the position, so that a link from said fix point to the associated electronic media can be provided to the user.

According to a seventeenth aspect of the invention, a computer program product comprising a computer readable medium, having thereon computer program code, to make a computer perform, when said program code is loaded in the computer, a method including obtaining a fix point, obtaining a travel scheme for fix points, positioning of said fix point in said travel scheme, obtaining at least a link to electronic media data under a control of a user, determining a position of said user, and associating said electronic media data with said at least one fix point based on the determined position, so that a link from said fix point to the associated electronic media data can be provided to the user, in relation to said travel scheme.

According to an eighteenth aspect of the invention, a computer program element comprising computer program code to make a computer perform a method including obtaining a fix point, providing a travel scheme for fix points, placing said fix point in said travel scheme, obtaining electronic media data under a control of a user, determining a position of said user, and associating said obtained electronic media data with said fix point based on the determined position, so that a link from said fix point to the associated electronic media data can be provided to the user, in relation to said travel scheme.

According to a nineteenth aspect of the invention, an electronic communication system includes at least one electronic communication device and at least one portable electronic device. The at least one electronic communicating device is arranged to obtain a fix point, provide a travel scheme for fix points, and place said fix point on said travel scheme. The at least one portable electronic device comprises a user input unit, arranged to receive user input data, a positioning unit, arranged to determine the position of a user, at least one data receiving unit, arranged to receive electronic media data in dependence of user control via the user input unit, and a control unit arranged to obtain said fix point, to receive positioning information obtained by the positioning unit, and to associate received electronic media data with said fix point based on the positioning information, so that a link from said fix point to the associated electronic media data can be provided to the user.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which:

FIG. 3 depicts a system for organizing data in relation to fix points of geographic locations, according to the present invention;

FIG. 4 shows an information presenting unit of the portable electronic device from FIG. 2, displaying several icons;

FIG. 5 shows a schematic representation of an application connected to an icon from FIG. 4;

FIG. 6r shows a computer program product, having thereon computer program code means, related to the present invention;

DETAILED DESCRIPTION OF THE EMBODIMENTS

Implementations consistent with principles of the invention relate to provision of an electronic communication device, a portable electronic device, a method and a system for organizing data in relation to fix points of geographic locations.

Figure 1:
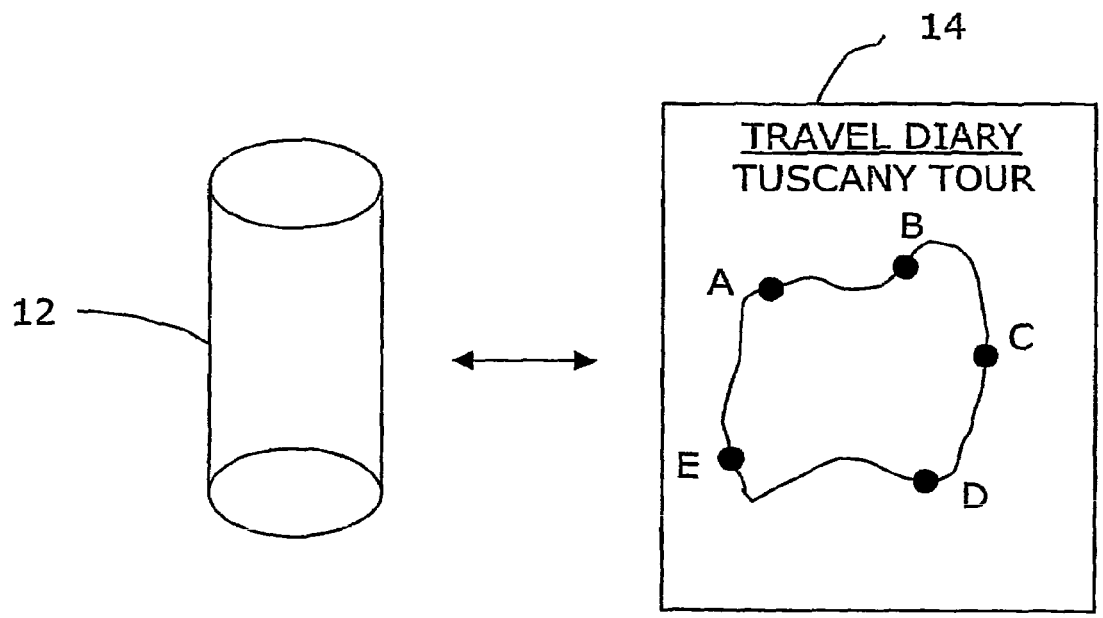
FIG. 1 visualizes a connection between an electronic communication device according to the present invention and a schematic representation of an application to be run within said electronic communication device.

Reference will now be given to FIG. 1 showing an electronic communication device according to an aspect of the invention and a schematic representation of an application to be run within said electronic communication device. According to one embodiment of the invention this electronic communication device is a computer server, 12, in which server an application, 14, is run.

Figure 2:
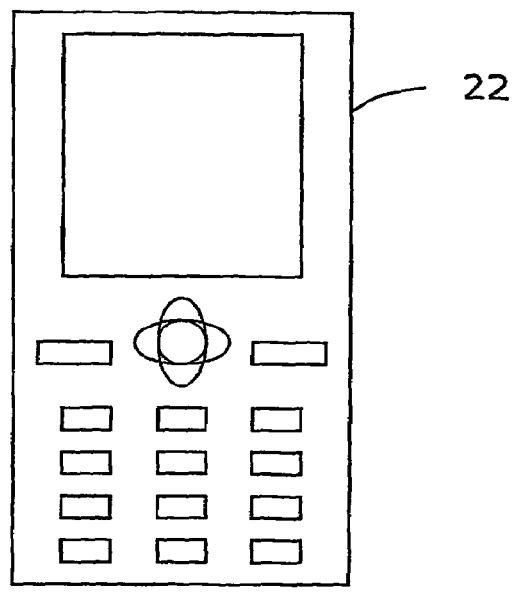
FIG. 2 shows a portable electronic device according to the present invention.

FIG. 2 shows a portable electronic device, 22, according to an aspect of the invention. In one embodiment of the invention, device 22 is a mobile telephone. It is understood that this portable electronic device can just as well be a PDA (Personal Digital Assistant), a palm top computer, a lap top computer and even a regular computer, such as a PC (Personal computer), in an alternative embodiment of the invention.

According to one embodiment of the invention, a method for organizing obtained data in relation to fix points of geographic locations, to be described in more detail later, includes acts, some of which are performed by the electronic communication device, and some of which are performed by the portable electronic device. According to this embodiment, the acts performed by the mobile phone, 22, may depend on the acts performed by the computer server, 12. The computer server, 12, for organizing data in relation to fix points of geographic locations, may be arranged to perform acts of the method in order to enable the mobile phone, 22, to perform the acts of the method to be executed by said mobile phone.

Implementations of the invention also relate to a system for organizing data related to fix points of geographic locations, which system comprises an electronic communication device, depicted as a computer server, 32, in FIG. 3, and a portable electronic device, depicted as a mobile phone, 36, in the same figure. The two devices are further arranged to communicate with each other. Electronic media data obtained by the mobile phone, 36, can for instance be communicated to the computer server, 32, and application data, to be explained later, is communicated from the computer server, 32, to the mobile phone, 36. In relation to the computer server, 32, a computer screen, 34, connected to the computer server, 32, is also shown.

FIG. 4 shows an information presentation unit in the form of a screen, 42, of for instance the mobile phone, visualizing a number of different icons. Upon activating an icon, 44, an application connected to the method according to one implementation of the invention is started. In FIG. 5, a schematic representation of this application, 52, is shown.

Moreover, FIG. 6 shows an example of a computer program product, in the form of a disc for carrying program code, for executing, when said computer program product is loaded in a computer or an electronic device, the steps related to the method according to an aspect of the invention.

Figure 7:
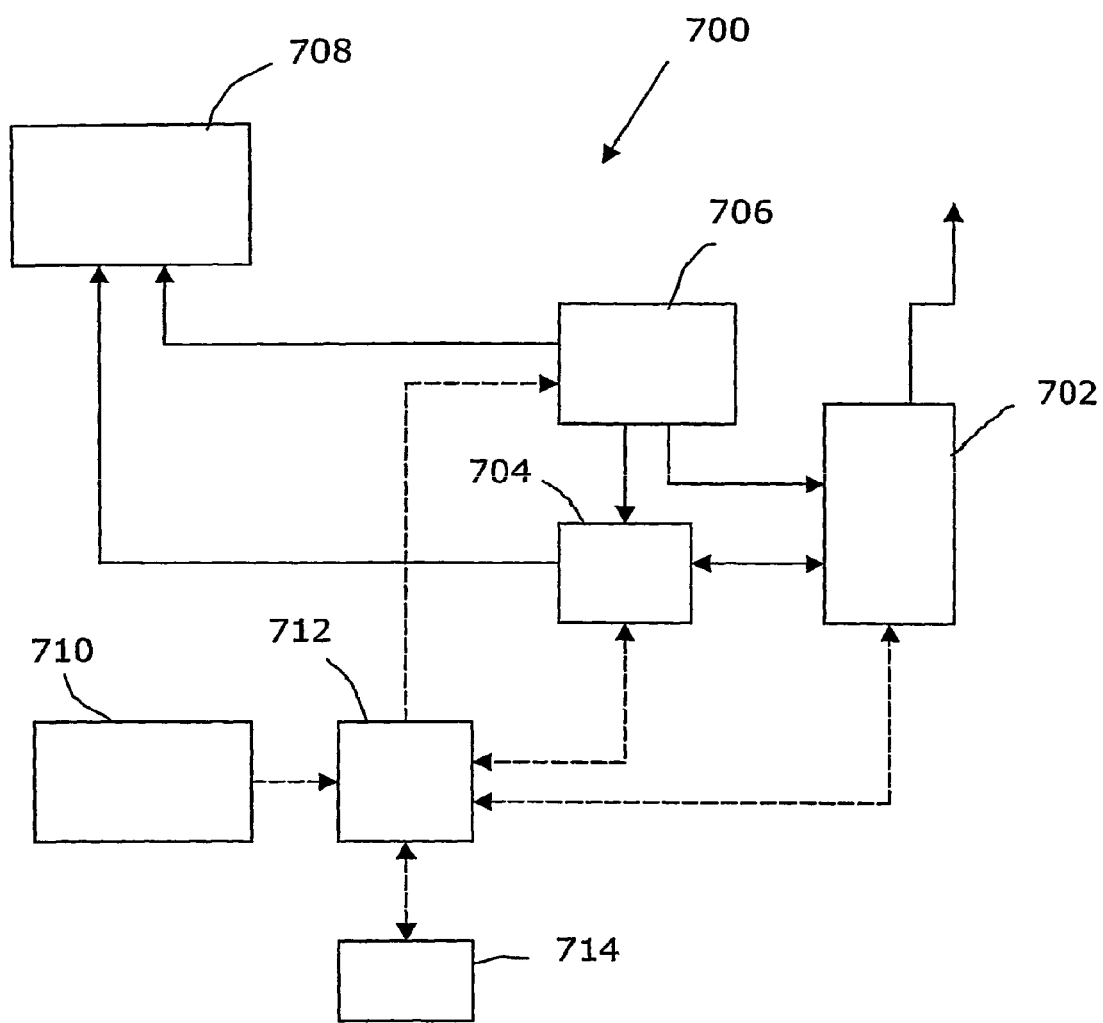
FIG. 7 shows a portable electronic device according to the present invention.
Figure 8:
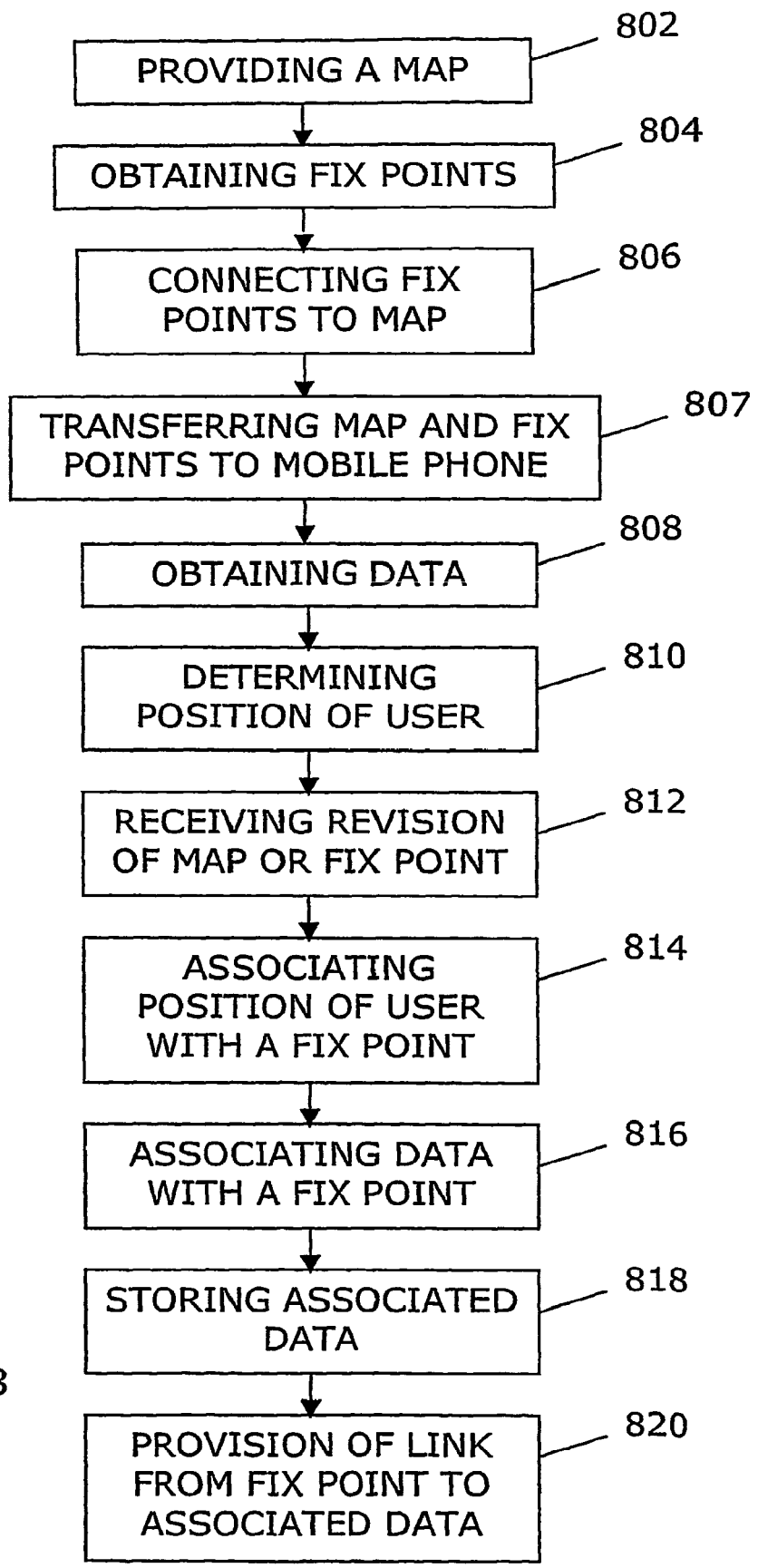
FIG. 8 presents a flow chart of the method according to the preferred embodiment of the present invention.

An implementation consistent with the principles of the invention will now be explained with reference to FIGS. 7 and 8, schematically presenting a portable electronic device, 700, and a flow-chart of the method for organizing obtained data in relation to fix points of geographic locations, respectively.

A portable electronic device, 700, according to an aspect of the invention is shown in FIG. 7. In one embodiment, the portable electronic device, 700, comprises two data receiving units, in the form of one communication unit, 702, and one data input unit, 706. The communication unit, 702, is arranged to send obtained data by the portable electronic device to the computer server, 32, and to receive application related data from the computer server, 32, or other electronic data, as such or in the form of a link to said data, from other parties by using for instance the World Wide Web. The data input unit, 706, is used for obtaining electronic media in any form. In one embodiment, the data input unit, 706, is a digital video camera that can record both audio and video information, as well as still/moving pictures or any combination thereof. This data input unit, 706, is thus arranged to record data. The portable communication device, 700, further comprises a control unit, 712, arranged to control the units included in portable electronic device, 700, such as the memory unit, 704, the positioning unit, 714, said data input unit, 706, and said communication unit, 702. The control unit, 712 therefore for instance controls the communication of data to and from the mobile phone, under the influence of the user, via a user input unit, 710, and the storing and retrieving data from the memory unit, 704. According to one embodiment, the portable electronic device also comprises a positioning unit, 714, that is used to serve the control unit, 712, with positioning information of the user of this portable electronic device, 700.

In one embodiment of the invention, this positioning unit 714 is a Global Positioning System (GPS) unit, as is well known to a person skilled in the art.

Data is presented to the user by the information presenting unit, 708, that is connected to both the data input unit, 706, and the memory unit, 704, which are under the control of the user.

The method for organizing data obtained in relation to fix points of geographic locations, will be described in more detail below with reference to the above mentioned FIG. 1, presenting the electronic communication device, in the form of the computer server, 12, and the application, 14.

This application is typically run by a user interested in traveling. The application is well suited for a person who appreciates having data, such as still pictures, video clips, sound recordings, text data, links or other electronic media data, related to a travel organized and easily accessible in relation to a representation of a geographic location, preferably where the data was obtained.

In this application, the user who would like to go traveling, for instance downloads a map of the area of interest. According to this embodiment a map is downloaded, but as an alternative in another embodiment the map can be any kind of scheme in which or onto which fix points can be attached, connected or associated. The scheme can for instance be a list, an array, a circular arrangement or order of objects, a roundtrip list, a collection of discrete fix points, any at least two fix point-group or any combination of fix points connected to each other.

Already at this stage, at home in front of the computer, sightseeing spots, such as museums, shops, monuments, beaches, discotheques, cities, regions, countries, etc., in short geographic locations worthwhile visiting are hence marked on the map as fix points by the user.

As can be realized below fix points may very well be revised, added or deleted by the user of the mobile phone, 36.

There may be several different schemes of travel-related data, such as maps with spots attached as fix points, stored in the computer and accessible by the user of the computer server. These schemes or maps can, for example, be arranged in an hierarchical order with a map covering, for instance, different cities, and other maps covering sightseeing spots or locations with each of these cities.

In one embodiment of the invention, the application, 14, as represented in FIG. 1, is a travel diary application. This travel diary application can, in accordance to what is out-lined above, provide a map to the user. The application further provides fix points of the geographic locations, selected by the user.

As is schematically presented in FIG. 1, the application, 14, provides a map including fix points of a Tuscany tour, with fix points A-E. These fix points, represented by one letter abbreviations, due to limited space, may be positioned at the geographic location of each of these fix points on the map.

By running this application in, for example, a mobile phone, the application data, i.e. the scheme, here in the form of a map, together with fix point information, is communicated from the computer server to the mobile phone. In the mobile phone, the map together with the attached fix points of geographic locations will thus be provided. During the travel, the user can use the mobile phone running this diary application, and has the possibility to collect data of interest and store said data in relation to the fix points attached to the map.

Consequently, in the method according to an embodiment of the invention, as will now be explained by referring to FIG. 8, the computer server, 12, provides a scheme, step 802, in the form of a map to the user under the control of the user. The user typically selects, for instance, a traveling area and the computer server, 12, provides a map of said selected area. It is realized that the user directly can select or choose a map, in an alternative embodiment. In connection to receiving the map, according to one embodiment, the user selects or chooses places worthwhile visiting, regions of interest, or, for instance, just sightseeing spots of potential interest. These selections or choices are marked by user and obtained by the computer server, step 804, according to the method as fix points. The computer server then connects said obtained fix points, step 806, to the chosen map. In this case, for which the scheme is in the form of a map, these fix points may be positioned at the individual geographic location of said fix points on the map. In an alternative embodiment, in which the scheme is a list or a non-map scheme, the fix points are ordered following another criterion, for instance, the order in which the corresponding physical locations may be visited or according to the length of time spent on the geographical location. In another alternative embodiment, time stamping of obtained data can be utilized in order to organize the data, so that the data can be organized according to the time it was acquired. The fix points may still carry information about the geographic location where the data was acquired, but also carry time information. Such an alternative may be used for following the change in flower blossoms for instance at a sight seeing spot, various trends, a changing scenery of for example the sky, or in order to form a series of pictures by connecting still pictures to one another, of for example, your brother's first parachuting event, or the changes in day light and the illumination of city, as a function of time.

Upon starting the application in the mobile phone, application information in the form of a map with attached fix points are transferred from the computer server to the mobile phone, step 807, in one embodiment of the invention. However, this information can be sent to the mobile phone prior to activating the application in the mobile phone, by using the system contact of the mobile phone. Of course, this information can also be sent over the system connector, even during activating of the application in the phone.

In one embodiment of the invention, the user can retrieve data, for instance, from a map elsewhere, by for example establishing a connecting between the portable electronic device and the electronic communication device. This may be used for finding a certain geographic location that may be difficult to find.

In one embodiment, when running the application, 44, in the portable electronic device, 700, in the form of for instance a mobile phone, the user collects data, i.e. the device obtains data, step 808, for Instance electronic multimedia data. Within the mobile phone information and data is presented to the user by utilizing the information presentation unit, 708. In one embodiment, this unit 708 is a color screen of any kind. In alternative embodiments the information presentation unit, 708, comprises a speaker, a ear-phone and/or a vibrator. According to said embodiments, the number of information presentation units, 708, can thus be two or more.

Returning to FIG. 8, the data obtained in this step, step 808, is typically received by the data input unit, 706, in the form of still pictures, moving pictures, sound or any combination thereof. In an alternative embodiment, the communicating unit, 702, obtains data, again under the control of the user, but in which the data obtained, at least is a link to data preferably of interest to the user. Thereafter, the positioning unit, 714, determines the position of the user, step 810, under the control of the control unit, 712. According to one embodiment of the invention, the control unit receives revision of the map or a fix point, step 812, under influence of a user, utilizing the user input unit, 710.

The revision of the map or a fix point in enabled because the user may very well modify his trip and decides to include a number of new fix points. By revising the map an additional tour may be added to the map, upon which new fix points may be required. During sightseeing additional fix points may just as well be added.

Upon, for example, taking a still picture, this electronic media data, is normally associated with the fix point that is physically closest to the position of the positioning unit.

In an alternative embodiment, the user may be asked to include a novel fix point, upon obtaining data, if the physical distance between an already existing fix point and the position of the positioning unit, is longer than a predefined distance, for the associating of the obtained data.

In one embodiment of the invention, this user input unit, 710, is a key pad unit. In an alternative embodiment of said invention, the user input unit, 710, is a touch screen. In yet another alternative, the user input unit, 710, and the information presentation unit, 708, is a single unit in the form of, for example, a touch screen.

Having access to positioning information, from the positioning unit, 714, the control unit, 712, associates the position of the user with a fix point, step 814. Thereafter, associating data with the fix point of the user is performed by the control unit, 712, step 816. Subsequently, the associated data is stored, step 818, in the memory unit, 704.

According to one embodiment of the invention, the electronic media data obtained by the user of the mobile phone, 700, is made available to the computer server, 12, in order to organize the data, so that a link from a least one fix point to the associated data can be provided to the same or another user of the computer server. According to one embodiment, the data obtained in the mobile phone is stored in said phone, by using the memory unit, 704, before making said data available to the computer server.

The memory unit, 704, is, according to one embodiment, a memory stick that can be detached from the mobile phone and inserted into an electronic device for reading memory sticks. In an alternative embodiment the memory unit, 704, is a USB-memory or any kind of electronic memory and according to yet another embodiment it is a hard disc of any kind.

As an alternative, the obtained data is communicated to the computer server in real or semi-real time. This communication can either be performed over the air interface, i.e. via the communication unit, 702, of the mobile phone, 700, or via a system connector (not shown) of said portable electronic device connecting the mobile phone to a network.

According to one embodiment of the invention, the communication between the portable electronic device, in the form of a mobile phone, and the electronic communication device, in the form of a computer server, is performed by using Multimedia messaging service (MMS). However, according to an alternative embodiment of the invention, the communication of data, e.g., electronic media data, is performed by using E-mail messages over the Internet. Other methods for communication may as well be possible using this invention, within an alternative embodiment.

According to one embodiment of the invention, the computer server, 12, when running the application, 14, controls whether the server has received any electronic media. If data has been received, the computer server provides a link from the fix point associated with the position where the data was obtained, to the data itself, step 820. By activating the link, i.e. by clicking of the fix point of geographic location, the user is given access to the data associated with said activated fix point associated with the position of the user where the data was obtained.

The order of the steps of the flow chart presented in FIG. 8, can the changed, for instance the step of receiving revision map or fix points, can instead be placed before the step of obtaining data or at some other position, or even be deleted, according to an alternative embodiment.

The data acquired by using the portable electronic device during a travel is thus not only organized but also easily accessible by using the application presenting various fix points of geographic locations.

According to one embodiment to the invention, the control unit, 712, within the portable electronic device as presented in FIG. 7, is for instance realized by one or more processors with attached processor memory, comprising computer program code, to make said processor or processors, when said program code is loaded in the portable electronic device, perform the steps of the method according to implementations consistent with the principles of the invention. This program code can be carried on a computer program product from which the code is read, or, for example be downloaded from the Internet by using the World Wide Web network in the form a computer program element for executing the steps of the method.

The electronic communication device, as schematically presented in FIG. 1, is realized by a computer server connected to a network including a transceiver device.

It is emphasized that this invention can be varied in many ways, of which the alternative embodiments above and below only are a few examples. These different embodiments are hence non-limiting examples. The scope of the invention, however, is only limited by the subsequently following claims.

According to another embodiment of the invention, the portable electronic device also performs some or all of the steps that are performed by the electronic communication device, according to one embodiment. That is, the method for organizing data in relation to fix points of geographic locations, is at least partly performed within the portable electronic device.

According to another embodiment of the invention, the application data sent from the electronic communication device to the portable electronic device contains discrete fix points only, i.e. without the enclosure or the scheme to which they are attached.

According to yet another embodiment of the invention, the electronic communication device contains a number of schemes with attached fix points, from which the user selects one or more schemes to be transmitted to or loaded into the portable electronic device. Upon activating the application in the portable electronic device the user selects which map is to be used.

According to still yet another embodiment of the invention, the application data created at the electronic communication device by the user, can be stored in a portable memory unit detachably connected to the electronic communication device. This memory unit is for example a USB-memory, which the user can connect to the portable electronic device for loading the application data into said portable electronic device.

According to yet another embodiment of the invention, the positioning of the user of the portable electronic is performed by utilizing any combination of the position of the neighboring base stations, the cell identity in with the user is located and Timing Advance (TA). Any other positioning method may very well be used in order to determine the position of the user of the portable electronic device such as triangulation.

According to yet another embodiment, the data input unit is a scanner, a text reading unit, such as a C-pen and/or a microphone.

According to another embodiment of the invention, the portable electronic device is a camera.

According to yet another embodiment of the invention, the portable electronic device is a wrist-watch camera.

According to still yet another embodiment of the invention, data obtained by a user at a position associated with a fix point, need not to be associated with the fix point associated to the user, but may be associated with another fix point, for instance by optionally answering a question, whether another fix point shall be used, by including this another fix point. When receiving, for example, a video-clip of Paris while physically being in Rome, there is a possibility to associate said video-clip with the fix point Paris, instead the fix point associated with the position of the user, when obtaining the data.

The invention claimed is:

1. A portable electronic device to at least partly organize data in relation to fix points of geographic locations, the portable electronic device comprising:
   a positioning unit configured to determine a geographic location of a user;
   a first data receiving unit configured to capture, based on input from the user, electronic media;
   where the captured electronic media comprises at least one of one or more picture files, or one or more video files;
   a second data receiving unit configured to receive a link to the captured electronic media; and
   a control unit configured to:
      receive selection, from the user, of a plurality of fix points, from the fix points of the geographic locations, on a map provided to the user, the map including the geographic locations,
      where the selected plurality of fix points are selected, by the user and based on the map provided to the user, prior to receiving the link, where each of the selected plurality of fix points is different from other ones of the selected plurality of fix points,
      receive the determined geographic location of the user from the positioning unit,
      determine whether a particular fix point, of the selected plurality of fix points, is a closest fix point, of the selected plurality of fix points, to the determined geographic location of the user,
      associate the determined geographic location of the user with the particular fix point when the particular fix point is the closest fix point to the determined geographic location of the user,
      associate the captured electronic media with the particular fix point when the particular fix point is the closest fix point to the determined geographic location of the user,
      receive the link from the particular fix point to the captured electronic media based on associating the captured electronic media with the particular fix point, the link allowing the captured electronic media to be retrieved upon selection of the particular fix point on the map provided to the user, and
      provide the captured electronic media to the user in response to receiving the selection of the particular fix point on the map and based on the received link.

2. The portable electronic device according to claim 1, in which the control unit further is further configured to:
   associate second data captured, by the first data receiving unit, at a second geographic location of the user, with a second fix point, of the selected plurality of fix points,
   where the second geographic location is different than the determined geographic location of the user and the second fix point is different than the particular fix point,
   where, when associating the second data with the second fix point, the control unit is to:
      determine whether the second fix point corresponds to a fix point that is closest to the second geographic location of the user, and
      associate the second data with the second fix point when the second fix point corresponds to the fix point that is closest to the second geographic location of the user.

3. The portable electronic device according to claim 1, further comprising:
   an information presentation unit, configured to present information by the control unit, under the control of the user.

4. The portable electronic device according to claim 1, further comprising:
- a memory unit configured to store data received from the first data receiving unit under the control of the control unit,
- where, when providing the capture electronic media, the control unit is further configured to:
  - retrieve the captured electronic media from the memory unit in response to receiving the selection of the particular fix point and based on the received link, and
  - provide the retrieved electronic media to the user.

5. The portable electronic device according to claim 1, in which the portable electronic device is a mobile phone.

6. The portable electronic device according to claim 1, where, when receiving the selection of the plurality of fix points, the control unit is further configured to:
- provide the map to the user, the map being provided without the selected plurality of fix points,
- receive, from the user, selection of a plurality of geographic locations, of the geographic locations included in the map, corresponding to the plurality of fix points, and
- provide, to the user, the selected plurality of fix points on the map provided to the user.

7. The portable electronic device according to claim 6, where the control unit is further configured to:
- receive, from the user, a request to remove at least one of the selected plurality of fix points from the map provided to the user,
- remove, based on the received request, the at least one of the selected plurality of fix points from the map provided to the user, and
- associate other electronic media with a fix point of a remaining selected plurality of fix points included in the map.

8. The portable electronic device according to claim 1, where the control unit is further configured to:
- receive, from the user and based on the map, selection of one or more other fix points, of the fix points, and
- provide, to the user, the selected one or more other fix points on the map.

9. The portable electronic device according to claim 8, where the first data receiving unit is further configured to capture other electronic media at another geographic location, the other electronic media including one or more video files, the other electronic media being captured after receiving selection of the one or more other fix points, and
where the control unit is further configured to:
- determine whether a fix point, of the one or more other fix points, corresponds to a fix point that is closest to the other geographic location, and
- associate the fix point, of the other fix points, with the other electronic media when the fix point, of the other fix points, corresponds to the fix point that is closest to the other geographic location.

10. The portable electronic device according to claim 1, where the control unit is further configured to:
- determine that the particular fix point is not the closest fix point to the determined geographic location of the user,
- determine whether another fix point, of the selected plurality of fix points, is the closest fix point to the determined geographic location of the user, and
- associate the determined geographic location of the user with the other fix point when the other fix point is the closest fix point to the determined geographic location of the user, and
- associate the captured electronic media with the other fix point when the other fix point is the closest fix point to the determined geographic location of the user.

11. The portable electronic device according to claim 1, where the first data receiving unit is further configured to capture other electronic media at another geographic location, and
where the control unit is further configured to:
- determine whether the selected plurality of fix points are within a predetermined distance from the other geographic location,
- receive selection, from the user, of another fix point corresponding to the other geographic location provided on a map when the selected plurality of fix points are outside the predetermined distance,
- associate the other geographic location with the other fix point, and
- associate the captured other electronic media with the other fix point.

* * * * *